Jan. 16, 1962     P. A. GARDNER     3,016,653
AGRICULTURAL LIQUID, SUCH AS WEEDICIDE OR
HORMONE, SPRAYING APPARATUS
Filed May 19, 1960
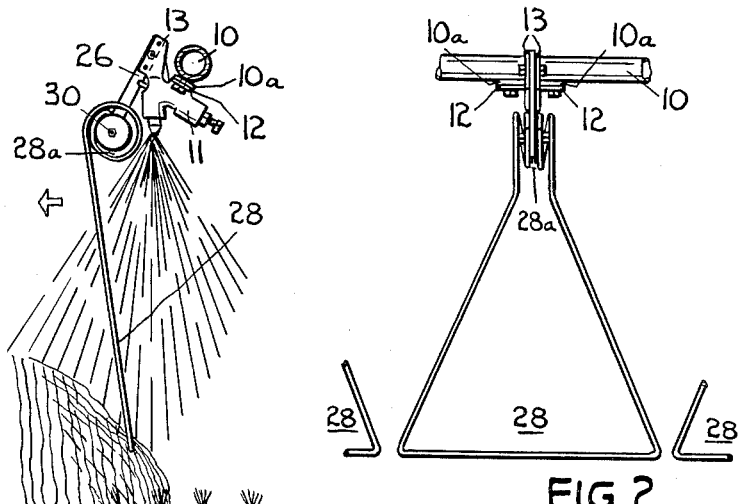
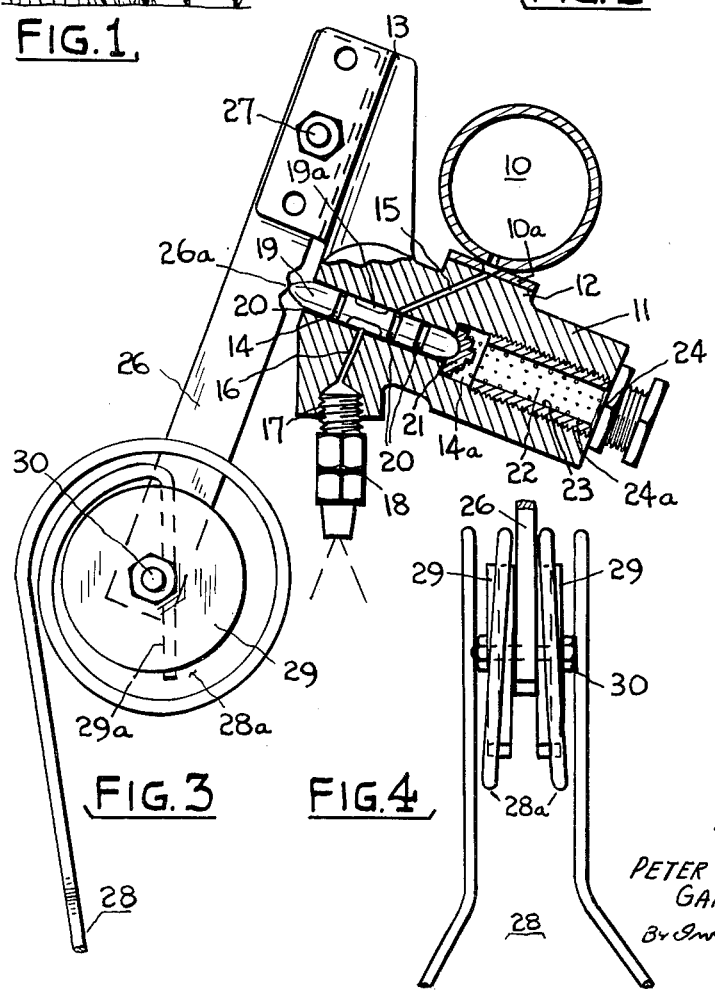
INVENTOR
PETER A. GARDNER
By Irwin S. Thompson
ATTY.

United States Patent Office 3,016,653
Patented Jan. 16, 1962

3,016,653
AGRICULTURAL LIQUID, SUCH AS WEEDICIDE OR HORMONE, SPRAYING APPARATUS
Peter Alexander Gardner, Mataia Glorit R.D., Kaukapakapa, New Zealand
Filed May 19, 1960, Ser. No. 30,119
7 Claims. (Cl. 47—1.7)

This invention relates to apparatus for use in the spraying of agricultural liquid such as weedicides or hormones.

In recent years the advances of scientific research have provided farmers with many effective weedicides; it is possible today to purchase selective type chemicals for differing types of weeds or undesired species of herbage found in pastures. Such latter types include the various thistles, tall fescue, rushes, gorse (especially regrowth and seedling) and blackberry. Each of these weeds may be found both scattered over the ground, or fairly dense. In the former case while it may be desirable to spray, generally the cheapest and in many cases the most effective weedicides can cause severe damage to and even loss of desirable species in the pasture which renders such spraying uneconomic.

Spot spraying by hand is extremely expensive as concerns time where areas are at all extensive.

This latter problem has led to this invention which allows the use of the most effective weedicide on the particular species encountered without waste of spray and without damage to uninfested areas of the pasture, by aiming to provide a means for spraying chemicals in solution to the control of weeds, noxious weeds, grasses, rushes and noxious shrubs growing in a pasture or other land. It is to be understood that the term "weeds" may include all or each of the before mentioned species or types, and shall include all or any such unnamed types as may be desirable constituents of any type of sward or crop, or classified by the Department of Agriculture as being within the before mentioned undesirable species or types.

Generally the invention covers agricultural liquid such as weedicide or hormone spraying apparatus comprising a supply pipe adapted for mounting to a vehicle, an automatic shut-off cock or tap connected to the pipe, a spray nozzle connected to depend from the tap and means associated with the tap including an element so arranged that it may encounter plants or weeds projecting above the average sward or pasture level or to each plant or weed whose leaf or foliage density is greater than that of the surrounding pasture or sward in travel of the vehicle to automatically actuate the tap and spray weedicide or hormone to the plant or weed.

In further describing the invention, reference will be made hereinafter to the accompanying drawing, in which:

FIGURE 1 is a sectional side view of the apparatus,

FIGURE 2 is a front view of components in the apparatus,

FIGURE 3 is a detail sectional side view of part of the apparatus, and

FIGURE 4 is a detail front view of the means associated with a cock or tap.

In further describing a preferred embodiment of the apparatus, the supply pipe is a rigid tubular boom (hereinafter called "boom 10"), which is adapted for attachment so that this boom can be adjustably mounted on the front of the vehicle (not shown) at right angles and horizontal to the longitudinal axis of the vehicle, such as a motor truck or tractor. Such adjustable mounting can be such that the height of the boom above ground level can be adjusted by mechanical or other means by the operator of the vehicle. At intervals along the length of the boom are fixed webs or side wings 10a (only one set shown) connecting the automatic shut-off cocks or taps. Each of these cocks or taps includes a body 11 cast with side wings or flanges 12, each having a bolting hole and a forward inclining web 13 having a number of bolting holes. The body is provided with a central bore 14 disposed approximately at right angles to the web 13. A rear portion 14a of this bore is cored out and tapped to a certain depth from the rear end. This bore is connected by an inlet duct 15 opening at the top of the body between its side flanges 12. A further outlet duct 16 connects the bore 14 to a tapped socket 17 into which is screwed the spray nozzle 18.

A valve is slidably mounted within the bore 14, and essentially consists of a plunger 19 waisted down at its centre 19a, so as to align with the openings of the ducts 15, 16 and has sealing rings 20 positioned at either end of such waisted centre 19a of the plunger. This valve plunger is of such length that its forward end always projects from the body 11, and its rear and inner end is set in a stepped head 21 against two springs, the smaller and lighter one 22 arranged within a larger and heavier one 23. Each spring is located on a step of the head 21 and extends into a hollowed centre 24a of an adjusting screw 24 screwed into the tapped bore portion 14a. The heavier spring 23 is shorter in length than the lighter spring 22 which normally seats at the bottom of the screw's centre 24a.

The boom 10 is mounted to the vehicle so that with the cocks bolted to the boom and the spray nozzles 18 screwed into the cocks, the liquid outlet level of the nozzles is about sixteen inches above average weed height from the ground. Each spray nozzle is arranged so that its outlet points downward or at a suitable angle for the liquid, as chemical weed spray, is directed on to weeds encountered in the forward travel of the vehicle. A spray nozzle having approximately 70° angle of spread is a very desirable one.

The means for actuating a tap to release the chemical spray consist of a trigger 26 carried by a pivot pin or bolt 27 passing through one of the holes in the web 13 of the tap body. This trigger 26 has a notch 26a shaped in its rear edge so that the projecting end of the valve plunger 19 engages against such notch.

To a lower end of this trigger 26 is a connection for the suspension element consisting of an inverted fan-shaped spring 28. This spring has its top ends coiled with an inner straight portion 28a which are located in grooves 29a of plates 29 clamping between them the coiled tops and the bottom end of the trigger 26 by a bolt 30. The spring 28 can be about twelve inches in width at its bottom and set so that it is adjacent to, but not touching a next actuating spring on either side, see FIGURE 2. The lowest part of the spring can be divided so that it will clear itself of an obstruction encountered during operation, yet return to the ready position. Adjustment of the connection between trigger 26 and spring 28 will allow the spring to be set on the trigger in a desired longitudinal position in relation to the line of travel, so that the bottom end and lower portion of the spring is in advance of or in a suitable position in relation to the spray pattern delivered on to the weeds. For a boom of ten feet in length, about nine of the taps and their actuating means spaced along the boom will be found suitable.

The trigger 26 is adjustable by its pivot bolt 27 being passed through a selected hole in the web 13 providing the fulcrum so that leverage exerted by the lower portion of the actuating spring 28 in prolongation acting against the projecting end of the valve plunger 19 can be adjusted according to the density of the sward or pasture and relative density of the herbage of the weeds desired to be sprayed.

Further adjustment can be made by screwing in or out.

the adjusting screw 24 in the back of the tap body which can regulate pressure of springs 22, 23 on the valve plunger 19 to enable the trigger spring 28 to resist desirable species in a pasture yet to be triggered by undesirable species of greater height or density.

In this manner spray is supplied automatically to plants or weeds projecting above the average sward or pasture level or to each plant or weed whose leaf or foliage density is greater than that of the surrounding pasture or sward.

It will be appreciated that the apparatus can be modified within the scope as defined by the appended claims. For instance, each tap may have a further outlet duct and a spray nozzle therefrom to enable extra and specially directed spread on to a weed or plant which actuates the trigger spring 28. Further, whilst a rigid "wet" boom has been featured, a "dry" boom can be employed whereby each cock or tape is connected by flexible hosing. Instead of weedicide, the apparatus can be employed for spraying hormone, soil sterilant, liquid fertiliser, or liquids for retardation or stimulation of plant growth.

Having now described my invention what I claim is:

1. An agricultural liquid spraying apparatus comprising a rigid tubular boom adustably mounted on a vehicle for supplying liquid spray, a plurality of automatic shut-off valves mounted on said tubular boom at intervals therealong, spray nozzles connected to said shut-off valves, each shut-off valve comprises a body having a bore, a valve plunger slidably mounted within the bore and set against a spring located in the body so that an outer end of the plunger projects forwardly from the body relative to line of travel of the vehicle, an inlet duct opening connected from an aperture in the boom to the bore, an outlet duct connected from the bore to the spray nozzle so that upon inward pressure on the projecting end of the plunger the ducts will be open to one another, and an element operatively connected to each shut-off valve which is arranged in a downward direction to encounter plants projecting above the average sward during travel of said vehicle thereby so as to automatically actuate said shut-off valve from which it depends to spray liquid onto the plant.

2. An agricultural liquid spraying apparatus according to claim 1, and wherein the value further includes a screw for adjusting the strength of the spring.

3. An agricultural liquid spraying apparatus according to claim 2, and wherein the value further includes a slidable head located against the inner end of the plunger and a further spring with both springs engaging against the head.

4. An agricultural liquid spraying apparatus according to claim 1, and wherein a trigger is pivotally mounted to the valve to engage the projecting end of the valve plunger and the element consists of an actuating spring fastened to a lower end of the trigger.

5. An agricultural liquid spraying apparatus according to claim 4, and wherein the actuating spring is of an inverted fan shape with the top end of the spring of coil form secured to the trigger.

6. An agricultural liquid spraying apparatus comprising a rigid tubular boom adjustably mounted on a vehicle for supplying liquid spray, a plurality of automatic shut-off valves mounted on said tubular boom at intervals therealong, webs disposed at said intervals along said boom, each shut-off valve having a flange by which it is affixed to one of said webs, spray nozzles connected to said shut-off valves, and an element operatively connected to each shut-off valve which is arranged in a downward direction to encounter plants projecting above the average sward during travel of said vehicle thereby so as to automatically actuate said shut-off valve from which it depends to spray liquid onto the plant.

7. An agricultural liquid-spraying apparatus comprising a rigid tubular boom adjustably mounted on a vehicle for supplying liquid spray, a plurality of automatic shut-off valves mounted on said tubular boom at intervals therealong, means pivotally connected to each shut-off valve to actuate said shut-off valve upon pivotal movement thereof, and an element operatively connected to each means and disposed in a downwardly direction to encounter plants projecting above the average sward during travel of said vehicle thereover so as to automatically actuate said shut-off valve through said means from which it depends to spray liquid onto the plant.

References Cited in the file of this patent

UNITED STATES PATENTS

| 612,321 | Evans | Oct. 11, 1898 |
| 1,611,774 | Peel | Dec. 21, 1926 |

FOREIGN PATENTS

| 49,831 | France | May 1, 1939 |
| | (Addition to No. 837,328) | |